US009613652B2

(12) United States Patent
Link et al.

(10) Patent No.: US 9,613,652 B2
(45) Date of Patent: Apr. 4, 2017

(54) PHASE ERROR RECOVERY CIRCUITRY AND METHOD FOR A MAGNETIC RECORDING DEVICE

(71) Applicant: Seagate Technology LLC, Cupertino, CA (US)

(72) Inventors: Michael J. Link, St. Paul, MN (US); Bruce Douglas Buch, Westborough, MA (US); Belkacem Derras, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/808,721

(22) Filed: Jul. 24, 2015

(65) Prior Publication Data

US 2017/0025147 A1   Jan. 26, 2017

(51) Int. Cl.
| | | |
|---|---|---|
| *G11B 5/09* | (2006.01) | |
| *G11B 20/10* | (2006.01) | |
| *G11B 20/18* | (2006.01) | |
| *G11B 5/00* | (2006.01) | |

(52) U.S. Cl.
CPC ............ *G11B 20/1024* (2013.01); *G11B 5/09* (2013.01); *G11B 20/1816* (2013.01); *G11B 2005/0021* (2013.01); *G11B 2020/183* (2013.01)

(58) Field of Classification Search
None
See application file for complete search history.

(56) References Cited

U.S. PATENT DOCUMENTS

| | | | |
|---|---|---|---|
| 5,173,710 A | 12/1992 | Kelley et al. | |
| 5,625,506 A * | 4/1997 | Dovek ............... | G11B 20/1403 360/51 |
| 5,754,437 A | 5/1998 | Blazo | |
| 6,100,683 A | 8/2000 | Lim et al. | |
| 6,236,343 B1 | 5/2001 | Patapoutian | |
| 6,615,361 B1 | 9/2003 | Patapoutian | |
| 6,636,120 B2 | 10/2003 | Bhakta et al. | |
| 7,295,644 B1 | 11/2007 | Wu et al. | |
| 7,643,235 B2 | 1/2010 | Erden et al. | |
| 7,733,588 B1 * | 6/2010 | Ying .................. | G11B 5/59688 360/39 |
| 7,825,739 B2 | 11/2010 | Higashino | |
| 8,040,994 B1 | 10/2011 | Patapoutian | |

(Continued)

OTHER PUBLICATIONS

File History for U.S. Appl. No. 14/808,736 retrieved from U.S. Patent and Trademark Office.

*Primary Examiner* — Peter Vincent Agustin
(74) *Attorney, Agent, or Firm* — Hollingsworth Davis, LLC

(57) ABSTRACT

A recording head is configured to write and read data sectors to and from a recording medium, such as a heat-assisted recording medium. A read channel is coupled to the recording head. Phase-locked loop (PLL) circuitry of the read channel is configured to detect a change in a phase error at a location of the data sector. The phase error change may be indicative of a mode-hop that occurred while writing the data sector to the medium. The PLL circuitry is configured to determine a phase offset using the phase error. A controller is configured to effect re-reading of the data sector location using the phase offset to recover the data sector location.

19 Claims, 8 Drawing Sheets

(56) References Cited

U.S. PATENT DOCUMENTS

| | | | |
|---|---|---|---|
| 8,570,679 B2 | 10/2013 | Wu et al. | |
| 2003/0137765 A1* | 7/2003 | Yamazaki | G11B 5/09 360/39 |
| 2004/0004962 A1 | 1/2004 | Glazko et al. | |
| 2004/0252607 A1* | 12/2004 | Muzio | G11B 7/24082 369/47.27 |
| 2005/0286353 A1* | 12/2005 | Hanano | G11B 7/0053 369/44.13 |
| 2006/0192620 A1* | 8/2006 | Beaulaton | H03L 7/1976 331/1 A |
| 2007/0064836 A1 | 3/2007 | Byrne et al. | |
| 2015/0030104 A1 | 1/2015 | Jeon et al. | |
| 2015/0372682 A1 | 12/2015 | Alexeyev et al. | |
| 2016/0028411 A1 | 1/2016 | Kuo et al. | |

* cited by examiner

PHASE ERROR RECOVERY CIRCUITRY AND METHOD FOR A MAGNETIC RECORDING DEVICE

SUMMARY

Embodiments are directed to a method comprising reading a data sector from a magnetic recording medium, and detecting a change in a phase error at a location of the data sector. The method also comprises determining a phase offset using the phase error change, and re-reading the data sector location using the phase offset to recover the data sector location.

Other embodiments are directed to an apparatus comprising a phase detector of a read channel configured to receive an error signal for a data sector written to a magnetic recording medium, the phase detector configured to detect a change in a phase error in the error signal and produce a phase error signal indicative of the phase error change. A PLL filter is configured to receive the phase error signal and produce a phase signal. A phase offset generator is configured to receive the phase error signal and produce a phase offset signal using the phase error signal. An adder is configured to sum the phase signal and the phase offset signal to produce a phase adjustment signal.

Some embodiments are directed to an apparatus comprising a recording head configured to write and read data sectors to and from a recording medium, and a read channel coupled to the recording head. PLL circuitry of the read channel is configured to detect a change in a phase error at a location of the data sector, the PLL circuitry configured to determine a phase offset using the phase error. A controller is configured to effect re-reading of the data sector location using the phase offset to recover the data sector location.

Further embodiments are directed to a method comprising reading a data sector from a heat-assisted magnetic recording (HAMR) medium, and detecting a change in a phase error at a location of the data sector indicative of a mode-hop that occurred while writing the data sector to the medium. The method also comprises determining a phase offset using the phase error change, and re-reading the data sector location using the phase offset to recover the data sector location.

Other embodiments are directed to an apparatus comprising a recording head configured to write and read data sectors to and from a heat-assisted recording medium. A read channel is coupled to the recording head. Phase-locked loop (PLL) circuitry of the read channel is configured to detect a change in a phase error at a location of the data sector indicative of a mode-hop that occurred while writing the data sector to the medium. The PLL circuitry is configured to determine a phase offset using the phase error. A controller is configured to effect re-reading of the data sector location using the phase offset to recover the data sector location.

Some embodiments are directed to an apparatus comprising a phase detector of a read channel configured to receive an error signal for a data sector written to a heat-assisted magnetic recording medium. The phase detector is configured to detect a change in a phase error in the error signal indicative of a mode-hop that occurred during writing of data to the medium and produce a phase error signal indicative of the phase error change. A PLL filter is configured to receive the phase error signal and produce a phase signal. A phase offset generator is configured to receive the phase error signal and produce a phase offset signal using the phase error signal. An adder is configured to sum the phase signal and the phase offset signal to produce a phase adjustment signal.

The above summary is not intended to describe each disclosed embodiment or every implementation of the present disclosure. The Figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
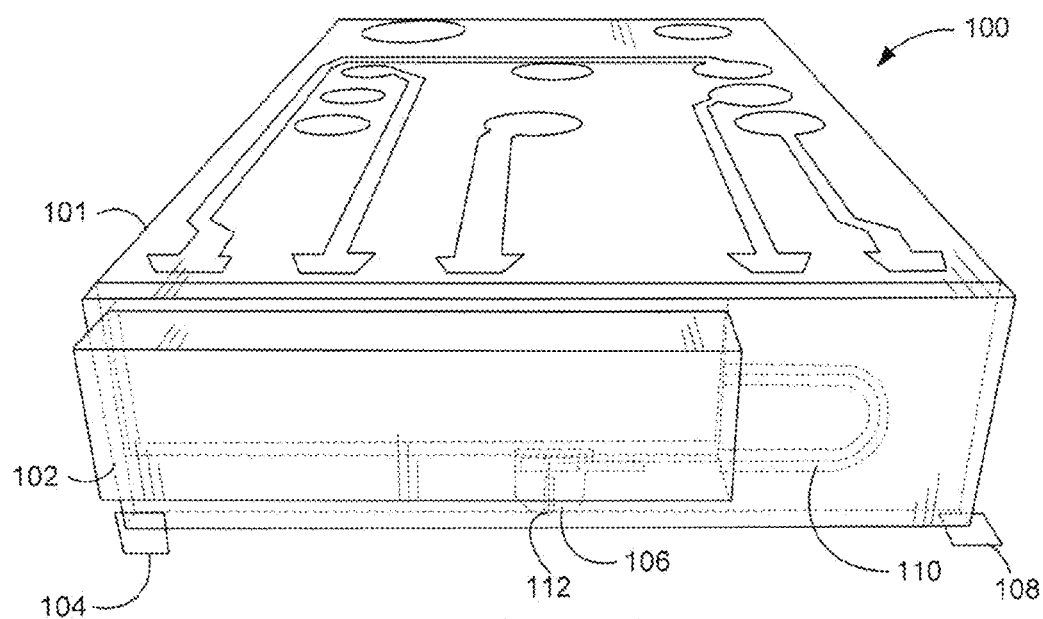
FIG. 1 show a perspective view of a HAMR slider configuration according to some embodiments.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Embodiments of the disclosure are directed to reading data from a magnetic recording medium that is adversely impacted by a frequency mode hop that can occur during writing of the data. Embodiments are directed to managing within a read channel an abrupt change in read phase error that results from reading data impacted by a frequency mode hop that would otherwise render the data unreadable or unrecoverable.

In heat-assisted magnetic recording (HAMR) devices, also sometimes referred to as thermal-assisted magnetic recording (TAMR) devices or energy assisted magnetic recording (EAMR), a magnetic recording medium (e.g., hard drive disk) is able to overcome superparamagnetic effects that limit the areal data density of typical magnetic media. In a HAMR recording device, information bits are recorded on a storage layer at elevated temperatures. The heated area in the storage layer determines the data bit dimension, and linear recording density is determined by the magnetic transitions between the data bits.

In order to achieve desired data density, a HAMR recording head (e.g., slider) includes optical components that direct light from a laser to the recording media. The HAMR media hotspot (thermal hotspot) generally needs to be smaller than a half-wavelength of light available from current sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT is designed to support local surface-plasmon at a designed light wavelength. At resonance, high electric field surrounds the NFT due to the collective oscillation of electrons in the metal. Part of the field will tunnel into a magnetic recording medium and get absorbed, raising the temperature of the medium locally for recording. During recording, a write element (e.g., write pole) applies a magnetic field to the heated portion (thermal hotspot) of the medium. The heat lowers the magnetic coercivity of the medium, allowing the applied field to change the magnetic orientation of heated portion. The magnetic orientation of the heated portion determines whether a one or a zero is recorded. By varying the magnetic field applied to the magnetic recording medium while it is moving, data is encoded onto the medium.

Figure 2:
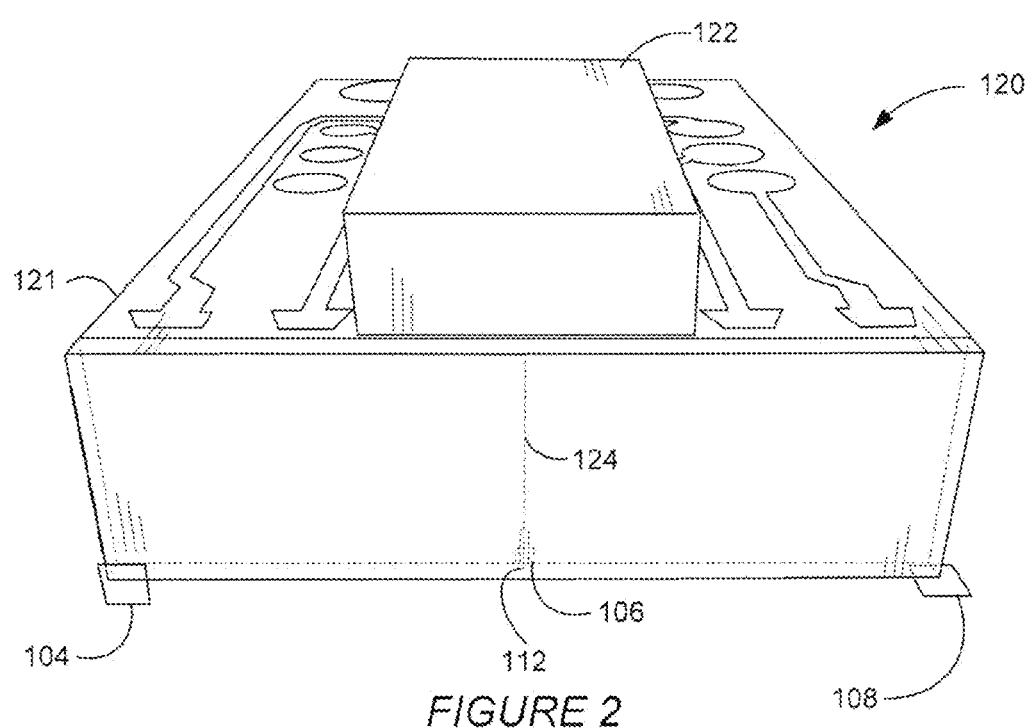
FIG. 2 show a perspective view of a HAMR slider configuration according to other embodiments.

A HAMR drive, for example, uses a laser diode to heat the magnetic recording medium to aid in the recording process. FIGS. 1 and 2 show perspective views of HAMR slider configurations according to representative embodiments. For simplicity, like reference numbers are used in FIGS. 1 and 2. In FIG. 1, a slider 100 has a laser-in-slider (LIS) configuration. In this configuration, the slider 100 includes a slider body 101 having an edge-emitting laser diode 102 integrated into a trailing edge surface 104 of the slider body 101. In this example, the laser diode 102 is disposed within a cavity formed in the trailing edge surface 104. The laser diode 102 is proximate to a HAMR read/write element 106, which has one edge on an air bearing surface 108 of the slider 100. The air bearing surface 108 faces and is held proximate to a moving media surface (not shown) during device operation.

While here the read/write element 106 is shown as a single unit, this type of device may have a physically and electrically separate read element (e.g., magnetoresistive stack) and write element (e.g., a write coil and pole) that are located in the same general region of the slider 100. The separate read and write portion of the read/write element 106 may be separately controlled (e.g., having different signal lines, different head-to-media spacing control elements, etc.), although may share some common elements (e.g., common signal return path). It will be understood that the concepts described relative to the read/write element 106 may be applicable to individual read or write portions thereof, and may be also applicable where multiple ones of the read write portions are used, e.g., two or more read elements, two or more write elements, etc.

The laser diode 102 provides electromagnetic energy to heat the media surface at a point near to the read/write element 106. Optical path components, such as a waveguide 110, are formed integrally within the slider 100 to deliver light from the laser diode 102 to the media. In particular, a local waveguide and NFT 112 may be located proximate the read/write element 106 to provide local heating of the media during write operations.

Various components (e.g., 106, 112, including the laser diode 102) may also experience significant heating due to light absorption and electric-to-optical conversion inefficiencies as energy produced by the laser diode 102 is delivered to the magnetic recording medium (not shown). During write operation, these light absorption and inefficiencies will vary the junction temperature of the laser diode, causing a shift in laser emission wavelength, leading to a change of optical feedback from optical path in slider to the cavity of the laser diode 102, a phenomenon that is known to lead to frequency mode hopping of the laser diode 102. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy with a second wavelength) performing "mode hopping." It is thought that mode hopping is caused by a temperature induced change in external optical feedback, mainly due to the shift in gain peak wavelength from a change in band gap with temperature. Temperature induced changes in the index of refraction and the thermal expansion of the materials that form the laser cavity can also contribute to mode hopping. Both of these cause the mode wavelength to increase but the contribution from the latter, typically 0.06 nm/K, is much smaller than the peak gain shift, typically 0.25 nm/K. As the temperature at the laser diode junction increases, the gain peak will overtake the modes leading to mode hopping.

Mode hopping is problematic for HAMR application's, as mode hopping leads to laser output power jumping and magnetic transition shifting from one block of data to another. For example, mode hopping results in shifting of the thermal hotspot from its expected location, causing an abrupt shift in write phase and timing-induced errors when reading data at locations impacted by the mode hop. Large transition shifts in a block of data cannot be recovered using conventional channel decoding, resulting in error bits.

In FIG. 2, a laser-on-slider (LOS) configuration 120 is illustrated. This example includes a laser diode 122 that is mounted on a top surface of a slider body 121. The laser diode 122 is coupled to an optical path of the slider body 121 that includes, among other things, an optical path 124 (e.g., a straight waveguide). In this configuration, the laser diode 122 may also be edge-emitting, such that the light is emitted from the laser diode 122. In order to direct the light towards the air bearing surface 108, the laser diode 122 (or other component) may include optical path elements such as a mirror (not shown) that redirects the light emitted from the laser diode 122 towards the air bearing surface 108. In other configurations, an edge-emitting, top-mounted laser diode may be oriented so that the light emitted directly downwards toward the air bearing surface 108. This may involve placing the laser diode 122 on a submount (not shown) on the top of the slider body 121, the submount orienting the laser output in the desired direction.

While other components shown in FIG. 2, such as the NFT 112 and read/write element 106, are referenced using the same numbers as FIG. 1, the physical configuration of these and other components may differ in the different slider arrangements, e.g., due to the differences in optical coupling pathways, materials, laser power, etc. However, similar to the configuration shown in FIG. 1, the laser diode 122 shown in FIG. 2 may experience mode hopping due to writing-induced temperature changes and due to return light (i.e. reflections back into light source) from the light path as well as from the magnetic recording medium.

Figure 3:
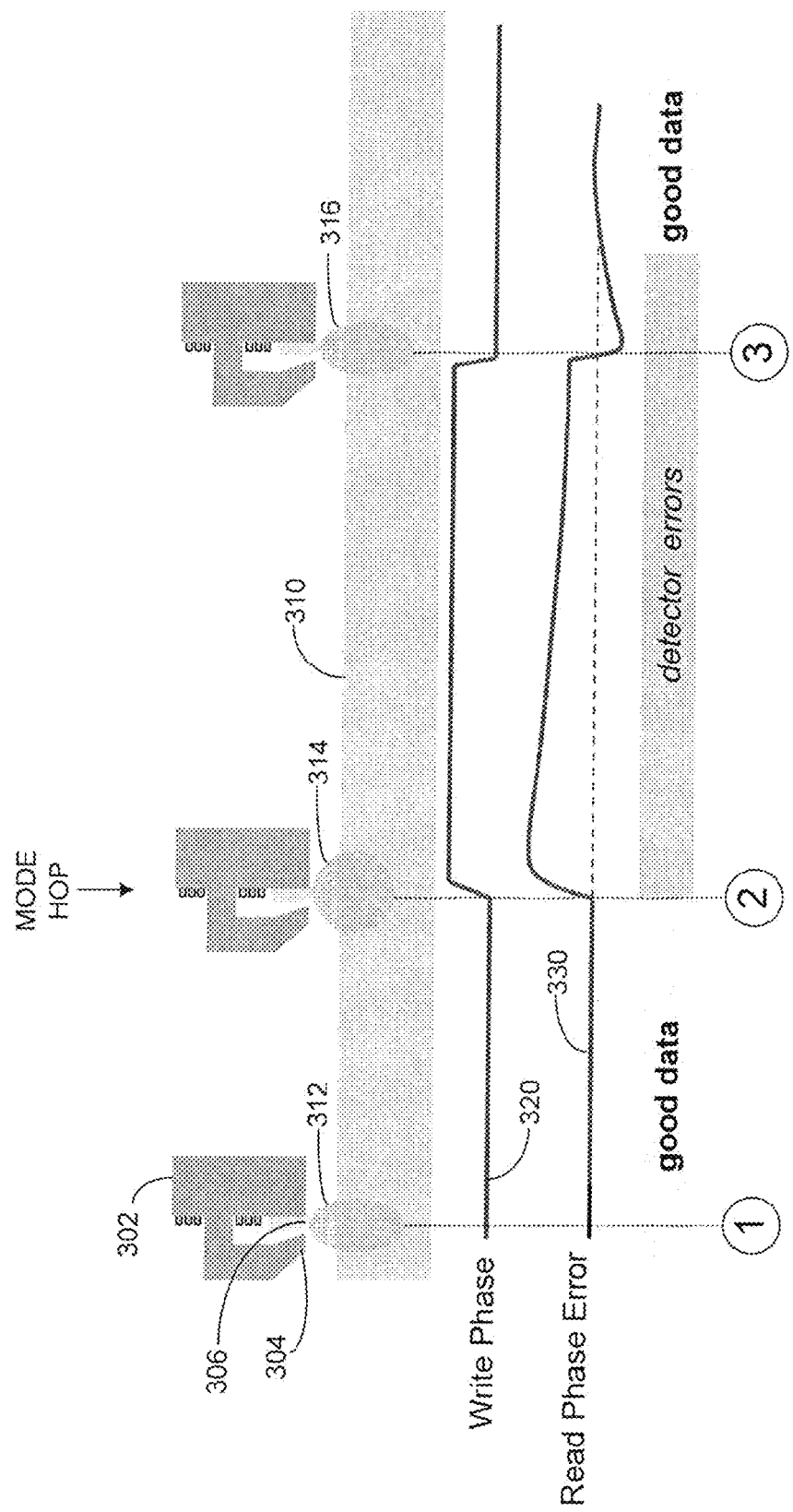
FIG. 3 illustrates a frequency mode hop that occurs when writing data to a magnetic recording medium using a HAMR head in accordance with various embodiments.

FIG. 3 illustrates a frequency mode hop that occurs when writing data to a magnetic recording medium using a HAMR head. A frequency mode hop occurring in the laser diode of the HAMR head results in creation of a thermal spot on the magnetic recording medium having a size different from an expected size. The abnormal size (too large or too small) of the thermal spot created during a frequency mode hop results in an abrupt shift in the write phase which, if undetected/uncorrected, results in a corresponding abrupt shift in a read phase error when reading data from the impacted location of the medium. Timing-induced errors around the mode hop are experienced when reading the data from the impacted location of the medium.

In FIG. 3, a HAMR head 302 is shown to include a writer 304 positioned proximate a an NFT 306. At position 1 of the medium 310, the writer 302 creates a thermal spot 312 having a normal size which is then magnetized (written to) by the writer 304. At position 2 on the medium 310, the writer 302 creates a thermal spot 314 having an enlarged size relative to thermal spot 312. Writing the enlarged thermal spot 314 at location 2 by the writer 302 causes an abrupt shift in the write phase 320. At position 3 of the medium 310, the writer 302 creates a thermal spot 316 having a normal size equivalent to that of thermal spot 312, resulting in a normal written phase 320.

Creation of the enlarged thermal spot 314 results in a shifting of the center of the thermal spot 314 from an expected location had the thermal spot 314 been of a normal size. In the case of an enlarged thermal spot 314 (as is shown in FIG. 3), the thermal spot 314 is located closer to the first thermal spot 312 than expected, resulting in a positive change in the written phase 320. In some cases, the writer 302 can create a thermal spot that is smaller than expected, in which case the center of the smaller thermal spot would be located further from the previous (normal) thermal spot than expected, resulting in a negative change in the written phase 320. A negative change in the written phase 320 is shown at position 3 of the medium 310, due to the distance between the center of the enlarged thermal spot 314 and that of the normal thermal spot 316 being greater than an expected distance. In either case, an abrupt shift in write phase occurs in response to writing either an enlarged thermal spot or a thermal spot that is smaller than expected.

FIG. 3 shows a read phase error 330 in time alignment with the write phase 320. Good data is read between positions 1 and 2 on the medium 310. At position 2, an abrupt change in the read phase error 330 occurs due to the corresponding abrupt change in the write phase 320 at location 2. Detector errors occur between positions 2 and 3 on the medium 310 due to the read channels inability to compensate for the abrupt change in the read phase error 330. Using conventional implementations, the abrupt change in the read phase error 330 due to a frequency mode hop generally results in unrecoverable data at the impacted location of the medium 310.

Figure 4:
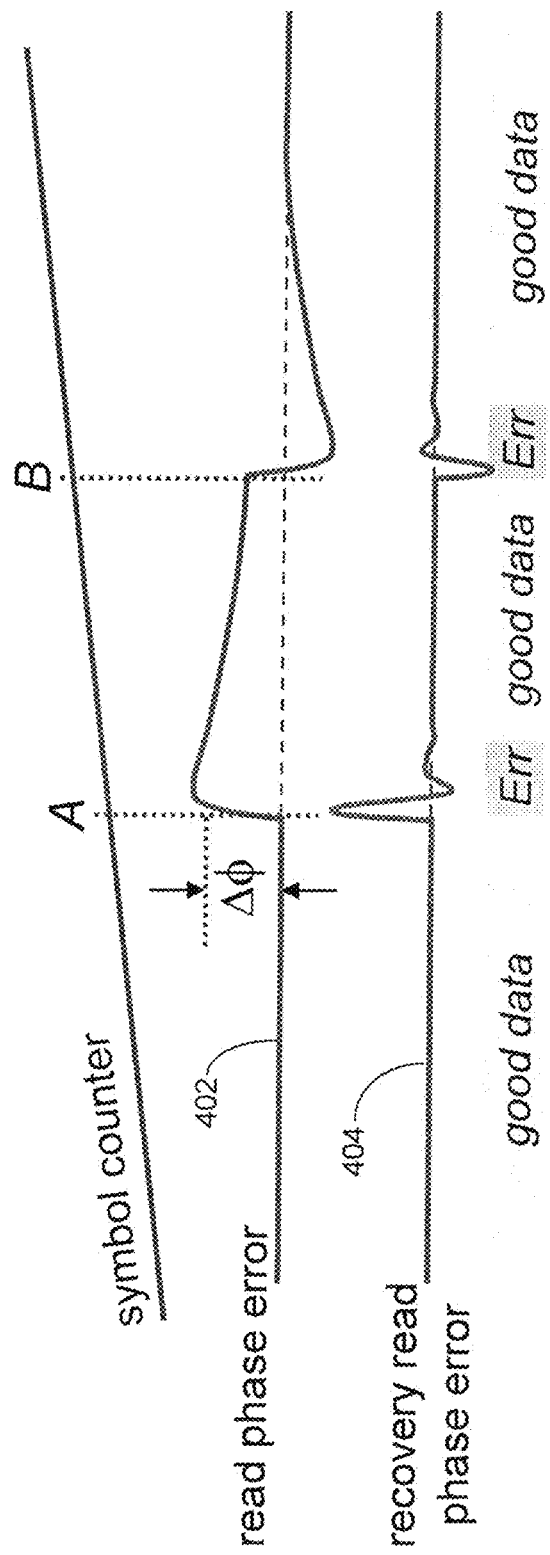
FIG. 4 illustrates read phase errors that occur when reading data from locations of medium that were written during a frequency mode hop of the HAMR head's laser diode in accordance with various embodiments.

FIG. 4 illustrates a read phase error that occurs when reading data from a location of a recording medium that was written during a frequency mode hop of a HAMR head's laser diode. FIG. 4 also shows how the read phase error is reduced in accordance with embodiments of the disclosure. In FIG. 4, an abrupt change in the read phase error 402 ($\Delta\phi$) can be seen to occur at symbol A. The abrupt change in the read phase error 402 at symbol A results from reading a data sector that was written during a frequency mode hop. It is noted that the abrupt change in the read phase error 402 at symbol A may result from a phenomena or event other than a mode hop.

Phase error adjustment circuitry of the present disclosure operates to address the increase in the read phase error 402 between symbols A and B by increasing the PLL bandwidth. The recovery read phase error 404 shows a recovery error (Err) at symbol A indicative of the response of the PLL circuitry to a sudden increase in bandwidth (e.g., due to the transient of introducing a compensating feedforward phase correction at symbol A). It is noted that the recovery read phase error 404 is near zero after symbol A, even though the symbols between A and B are written with the suddenly shifted phase via the compensating feedforward phase correction. The upward blip at symbol A and the downward blip at symbol B is characteristic of a high-pass response that would be expected from a sudden increase in the PLL bandwidth upon detecting a phase error jump (due to the larger thermal hotspot at symbol A and return to a normal sized hotspot at symbol B). Alternatively, the upward blip at symbol A and the downward blip at symbol B can be considered transients from imperfect (real-world) injection and subsequent removal of a feedforward phase intended to cancel the phase shift between symbols A and B.

Figure 5:
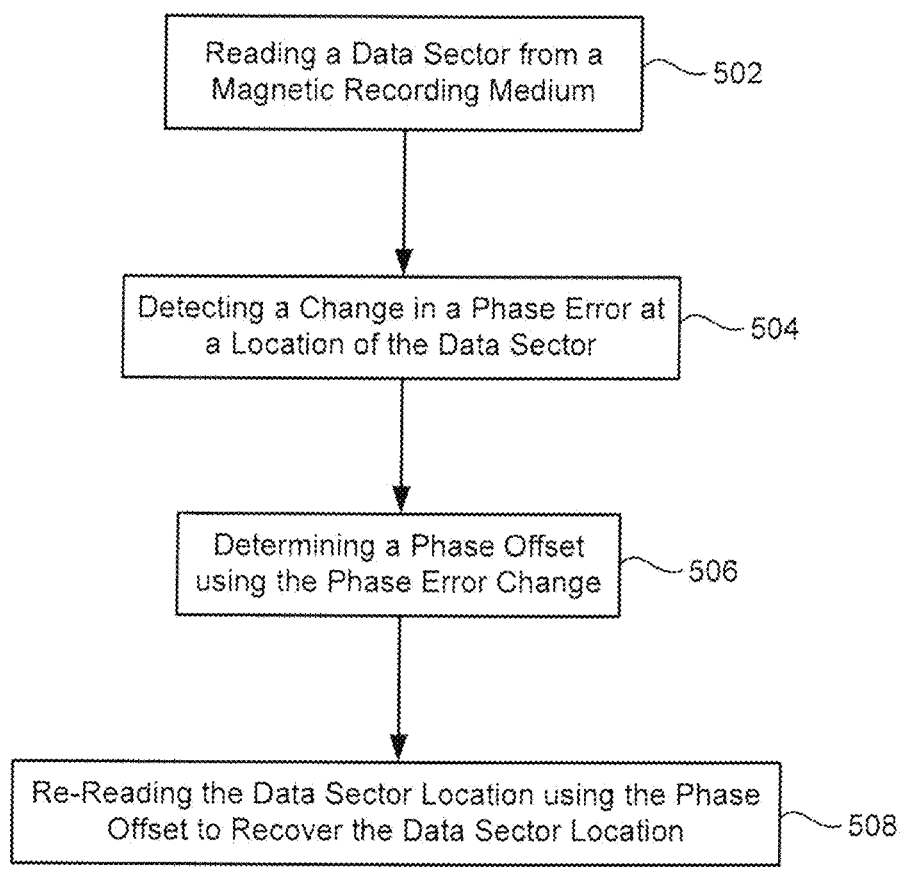
FIG. 5 illustrates various processes of a phase error adjustment methodology in accordance with various embodiments.

FIG. 5 illustrates various processes of a phase error adjustment methodology in accordance with various embodiments. The methodology illustrated in FIG. 5 involves reading 502 a data sector from a magnetic recording medium, and detecting 504 a change in a phase error for a location of the data sector. The methodology also involves determining 506 a phase offset using the phase error change, and re-reading 508 the data sector location using the phase offset to recover the data sector location. According to various embodiments, the change in phase error results from reading a data sector that was written during a frequency mode hop.

Figure 6:
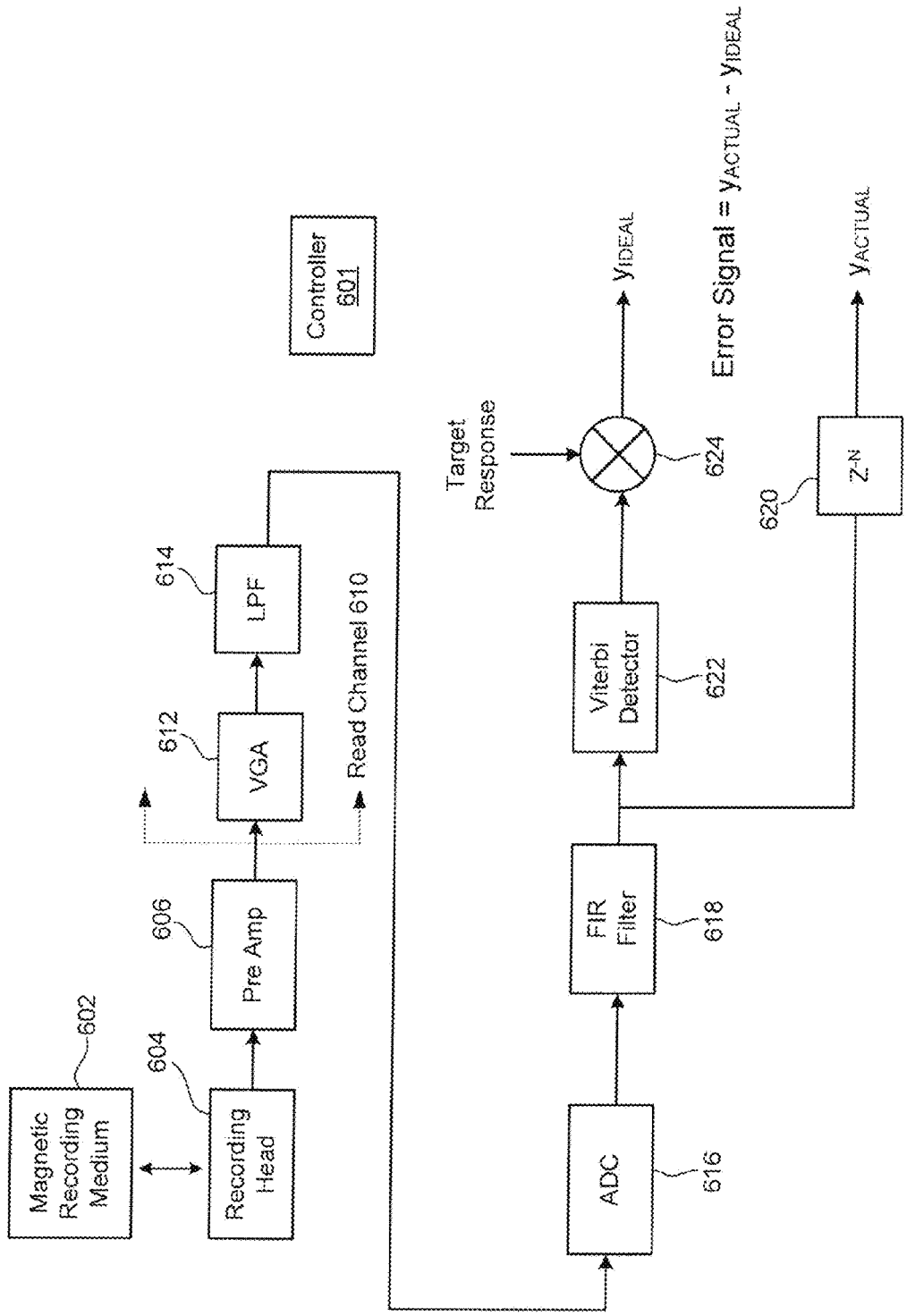
FIG. 6 illustrates components of a disk drive including a read channel in which PLL circuitry of the disclosure can be implemented according to various embodiments.

FIG. 6 illustrates components of a disk drive including a read channel in which PLL circuitry of the disclosure can be implemented according to various embodiments. The disk drive is preferably configured for heat-assisted magnetic recording, and includes a HAMR head 604 in proximity to a magnetic recording medium 602. The HAMR head 604 includes a reader, a writer, an NFT proximate the writer, a laser source, and an optical waveguide that optically couples laser light from the laser source to the NFT. The reader (e.g., a magneto-resistive reader) of the HAMR head 604 senses the magnetic flux from the medium 602 and generates an analog read signal. The reader of the head 604 transmits a resistance read signal that is received by preamplifier 606, which converts the resistance signal into a voltage signal. The preamplifier 606 provides the voltage read signal to a read channel 610, in which embodiments of the disclosure can be implemented. A controller 601 (e.g., a microprocessor, ASIC, or other logic device) can be configured to coordinate operations of the components shown in FIG. 6 and the PLL circuitry shown in other figures.

The read channel 610 is generally configured to perform a partial response maximum likelihood (PRML) approach to detecting and decoding data read from the medium 602. Typical components of the read channel 610 include a variable gain amplifier (VGA) 612, a low pass filter 614, an analog-to-digital converter (ADC) 616, a digital filter 618, and a Viterbi detector 622 coupled to a decoder (not shown). The VGA 612 receives the read signal, in the form of a time-varying voltage signal, from preamplifier 606, and produces an amplified read signal in accordance with the tolerances of ADC 616, and transfers the read signal to the low pass filter 614. The filtered read signal is sampled by ADC 616. The samples produced by the ADC 616 are passed through the digital filter 618, such as a finite impulse response (FIR) digital filter, to fit the samples to the desired channel response. These samples are then applied to the Viterbi detector 622 which generates encoded data that can be decoded by the decoder to complete the maximum likelihood detection process.

As is shown in FIG. 6, the output of the Viterbi detector 622, such as a low-latency Viterbi decoder, is convolved with the target response to produce an ideal signal, $y_{IDEAL}$. The output of the digital filter 618 is coupled to a delay circuit 620 which produces an actual signal, $y_{ACTUAL}$. An error signal is produced as the difference between the actual signal, $y_{ACTUAL}$, and the signal, $y_{IDEAL}$. This error signal is processed by PLL circuitry in a manner described hereinbelow.

Figure 7:
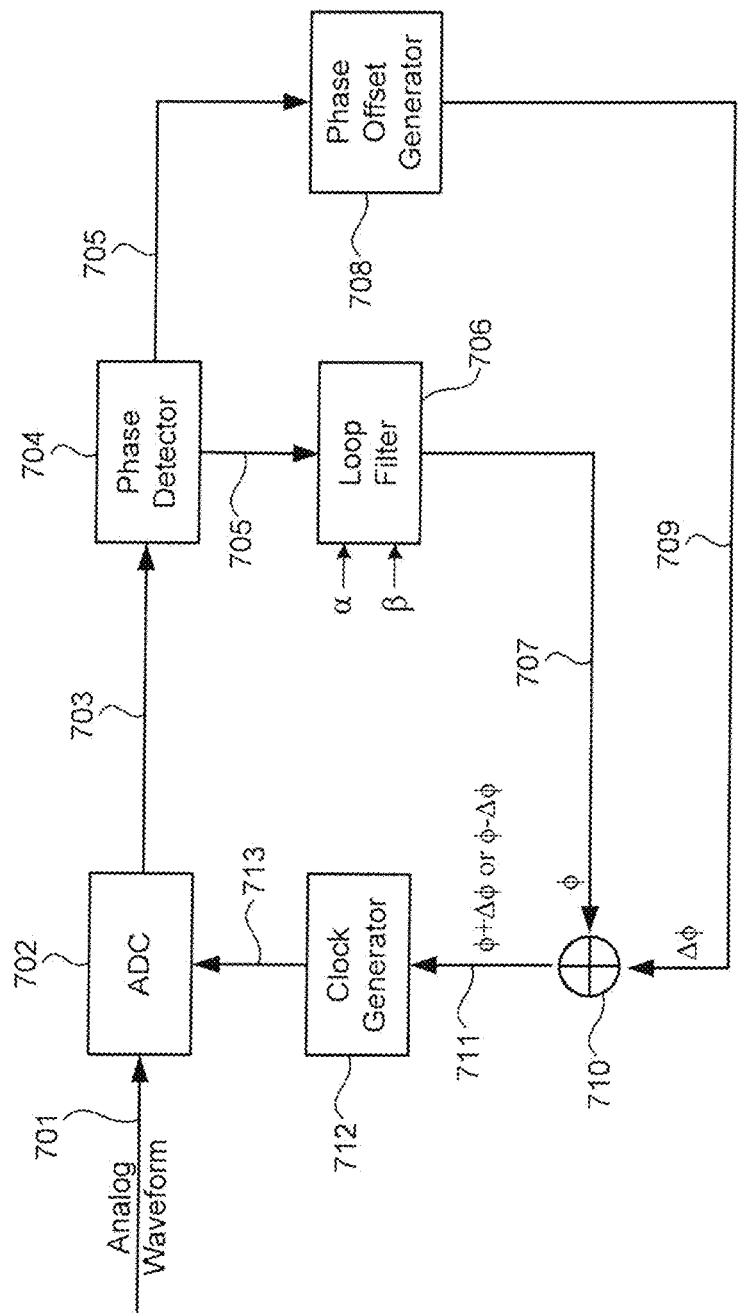
FIG. 7 illustrates PLL circuitry of a read channel in accordance with various embodiments.

FIG. 7 illustrates PLL circuitry of a read channel in accordance with various embodiments. The PLL circuitry 700 includes a phase detector 704 coupled to an ADC 702. The ADC 702 receives an analog waveform from upstream components of a read channel as discussed above. The phase detector 704 receives an error signal 703 (e.g., $y_{ACTUAL}-y_{IDEAL}$) at its input, and operates to generate a phase error signal 705 that corresponds to the phase difference between the analog waveform 701 and a clock signal 713 for the ADC 702. A loop filter 706 is coupled to the phase detector 704 and receives the phase error signal 705. A phase signal 707 is produced at the output of the loop filter 706. The loop filter 706 is configured to filter the phase error signal 705 and control how the PLL circuitry 700 responds to errors, by utilizing coefficients to weight phase errors. The coefficients typically include a phase coefficient, α, which affects phase adjustments to the clock signal 713, and a frequency coefficient, β, which affects frequency adjustments of the clock signal 713. Different phase and frequency coefficients can be used for an acquisition mode and a tracking mode. The acquisition mode coefficients are selected for fast and coarse adjustments of the clock signal 713. After a predetermined duration of time, such as a predetermined number of clock pulses, the tracking mode coefficients are substituted for the acquisition mode coefficients. The tracking mode coefficients are typically selected to provide highly accurate phase adjustments.

As is further shown in FIG. 7, the phase error signal 705 produced at the output of the phase detector 704 is received by a phase offset generator 708. The phase offset generator 708 is configured to produce a phase offset signal 709 (Δφ) using the phase error signal 705. In particular, the phase offset generator 708 is configured to determine a magnitude and a direction of an abrupt change in the phase error signal 705 resulting from a frequency mode hop that occurred during writing of data being processed by the read channel. The phase offset signal 709 (Δφ) produced by the phase offset generator 708 and the phase signal 707 (φ) produced by the loop filter 706 are communicated to an adder 710, which produces an adjusted phase signal 711. The adjusted phase signal 711 is communicated to the clock generator 712 which generates an adjusted clock signal 713 communicated to the ADC 702.

Figure 8:
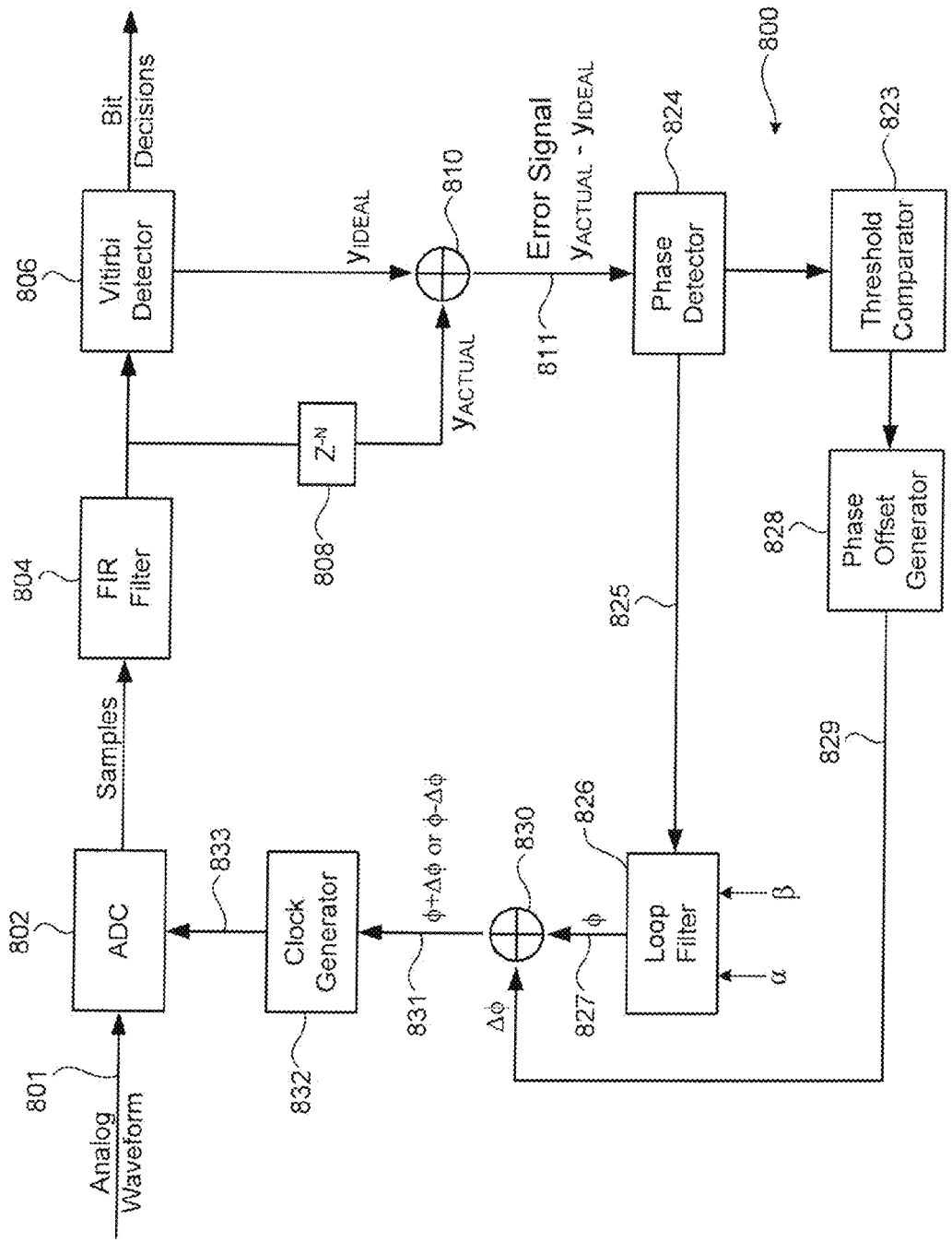
FIG. 8 illustrates PLL circuitry of a read channel in accordance with various embodiments.

FIG. 8 illustrates PLL circuitry of a read channel in accordance with various embodiments. FIG. 8 shows a portion of the read channel described previously in FIG. 6, including the ADC 802, the digital filter 804, the delay circuit 808, and the Viterbi detector 806. An error signal ($y_{ACTUAL}-y_{IDEAL}$) 811 is input to the PLL circuitry 800 shown in FIG. 8. The error signal 811 is input to the phase detector 824 which produces a phase error signal 825 as previously described. The phase error signal 825 is received by a threshold comparator 823, which compares the change in the phase error signal 825 to a programmed threshold. A change in the phase error signal 825 that exceeds the threshold is indicative of an abrupt change in the phase error signal 825 due to reading a data sector for which a frequency mode hop occurred while writing the data sector.

In response to the change in the phase error signal 825 exceeding the threshold, a phase offset generator 828 produces a phase offset signal 829 (Δφ). The phase error signal 825 produced by the phase detector 824 is received by a loop filter 826, which produces a phase signal 827 (φ). The phase signal 827 and the phase offset signal 829 are communicated to an adder 830, which produces an adjusted phase signal 831. A clock generator 832 receives the adjusted phase signal 831 and is configured to generate an adjusted clock signal 833 which is communicated to the ADC 802.

Figures 9A, 9B:
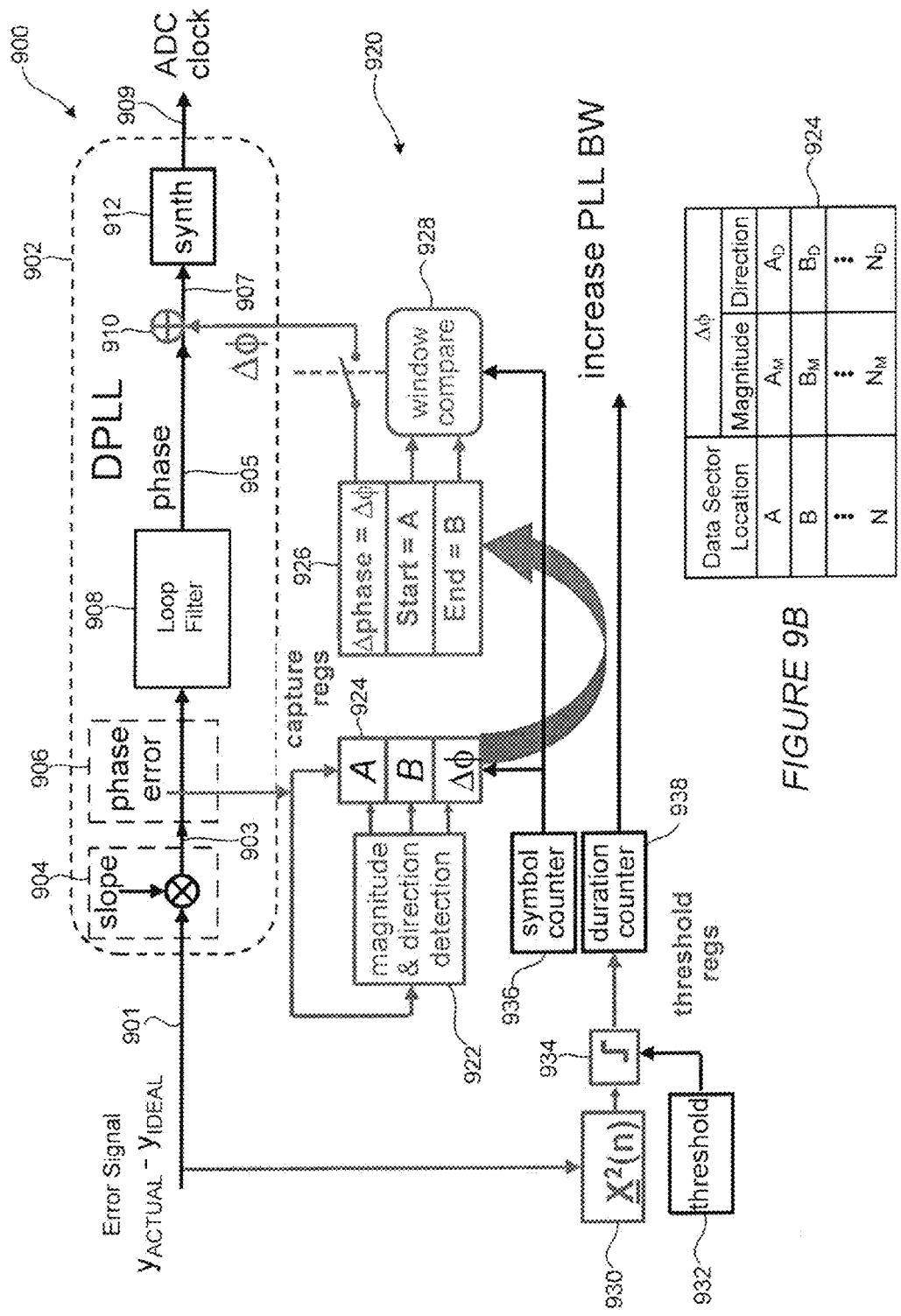
FIG. 9A is a block diagram of PLL circuitry of a read channel in accordance with various embodiments.
FIG. 9B illustrates phase error registers for use by the PLL circuitry shown in FIG. 9A.

FIG. 9A is a block diagram of PLL circuitry 900 of a read channel in accordance with various embodiments. The PLL circuitry 900 includes a digital PLL 902 coupled to phase error adjustment circuitry 920. The PLL circuitry 900 includes a phase detector 904 that receives an error signal 901 from upstream components of a read channel. The error signal 901 contains a read phase error indicative of a difference between an actual phase error in the read signal and an expected or ideal phase error in the read signal. The error signal 901 of FIG. 9A is equivalent to the error signal shown in FIG. 8, given by $y_{ACTUAL}-y_{IDEAL}$.

The phase detector 904 is configured to detect a change in the phase error present in the error signal 901. The phase detector 904 produces a phase error signal 903 indicative of a detected change in the phase error. The phase error signal 903 is subjected to threshold testing by a threshold detector 906, which is discussed in greater detail below. A loop filter 908 (e.g., a proportional-integral controller) receives the phase error signal 903 and utilizes coefficients to weight phase errors to control how the PLL 902 response to errors. As was discussed previously, the coefficients typically include a phase coefficient (α), which affects phase adjustments of the ADC clock signal, and a frequency quote efficient (β), which affects frequency adjustments of the ADC clock signal. It has been found that the loop filter 908 effects primarily phase adjustments (rather than phase and/or frequency adjustments) of the ADC clock signal when responding to phase error signal changes resulting from mode hops. A phase signal 905 is produced at the output of the loop filter 908, which is communicated to an adder 910. As is discussed in detail hereinbelow, and adjusted phase signal 907 is produced at the output of the adder 910 and is communicated to a synthesizer 912, the output of which is used to adjust the ADC clock signal.

According to one approach, the phase detector 904 determines the slope of error signal samples and multiplies the slope with the error signal 901 to determine the change in the phase error present in the error signal 901. A threshold detector 906 receives the phase error signal 903 and compares the phase error signal change to a threshold, such as a programmable threshold. A phase error signal change that exceeds the threshold is indicative of an abrupt change in the phase error due to reading a data sector location at which a mode hop occurred while writing the data sector. The abrupt change in the phase error signal 903 detected by the threshold detector 906 is one that would generally result in the data sector location being unrecoverable using conventional read recovery techniques. According to various embodiments, the PLL circuitry 900 includes phase error adjustment circuitry 920 that allows for recovery of the data sector location.

If the phase error signal change exceeds the threshold, a detector 922 operates on the phase error signal 903 to determine the magnitude and direction of the change or jump in the phase error signal. The magnitude and direction information is used to define a phase offset, $\Delta\phi$. A symbol counter 936 is used to keep count of symbols in the read data as they are processed. Phase error registers 924, such as those shown in FIG. 9B, are used to store phase magnitude, phase direction, and location information (symbol location via the symbol counter 936) for each data sector location (e.g., locations corresponding to symbols A, B, N) for which an abrupt change in read phase error has been detected due to a frequency mode hop having occurred while writing of the data sector location. It is noted that a frequency mode hop can occur once in a given data sector or two or more times in the same data sector. As such, the information stored in the phase error registers 924 can include one or multiple entries for a single data sector.

The phase error adjustment circuitry 920 operates during an error recovery mode to recover a data sector (e.g., one or more portions of the data sector) for which an abrupt change in read phase error occurred due to a frequency mode hop while writing the data sector. The phase error adjustment circuitry 920 includes a phase feedforward circuit 926 that operates cooperatively with the phase error registers 924, a location circuit 928, and the symbol counter 936. The location circuit 928 cooperates with the symbol counter 936 and is configured to determine the location within a data sector at which an above-threshold phase error signal change occurred. For example, the location circuit 928 can implement a window compare function to determine the data sector location at which phase error adjustment is to be performed.

During recovery of a data sector location impacted by a frequency mode hop during writing, the phase feedforward circuit 926 obtains location, magnitude, and direction information from the phase error registers 924 for a particular symbol (e.g., A) at the impacted data sector location. The location circuit 928 implements a window compare operations using the location information (e.g., for symbol A) from the phase error registers 924 in order to determine the location of the impacted data sector on the magnetic recording medium. A recovery read is issued with feedforward enabled by which feedforward phase correction is injected at the start of reading the impacted data sector location (e.g., at symbol A).

At the start of a re-read operation over the impacted data sector (e.g., at symbol A), the phase offset, $\Delta\phi$, is communicated from the phase feedforward circuit 926 to the adder 910. At the adder 910, the phase signal 905 from the loop filter 908 is added to the phase offset, $\Delta\phi$. In some cases, the phase offset, $\Delta\phi$, is subtracted from the phase signal 905. For symbol A shown in FIG. 4, for example, the direction of the read phase error occurring at symbol A due to a frequency mode hop is a positive direction. In this case, the phase offset, $\Delta\phi$, would be subtracted from the phase signal 905.

For the symbol B shown in FIG. 4, the direction of the read phase error occurring at symbol B due to a frequency mode hop is a negative direction. In this case, the phase offset, $\Delta\phi$, would be added to the phase signal 905. The adjusted phase signal 907 is communicated to the ADC clock generator which adjusts the phase of the ADC accordingly for the read recovery operation.

In some embodiments, the PLL circuitry 900 is configured to perform phase error adjustment in a manner discussed above and, concurrently, increase the PLL bandwidth in response to abrupt changes in the phase error signal. As is further shown in FIG. 9A, the error signal 901 is communicated to a windowed variance circuit 930 which performs an averaging function on n samples of the error signal 901. A comparator 934 compares an output of the windowed variance circuit 930 to a threshold 932. If the output exceeds the threshold, the bandwidth of the loop filter 908 is increased in an attempt to better respond to the large change in the phase error signal. A duration counter 932 measures the duration in which the threshold has been exceeded, which corresponds to the period of time during which the PLL bandwidth is increased. When the output of the windowed variance circuit 930 drops below the threshold 932, the duration counter 938 is reset, at which time the increase in PLL bandwidth is removed.

Embodiments of PLL circuitry have been described hereinabove in the context of managing abrupt changes in read phase error due to a frequency mode hop. It is understood that embodiments of the PLL circuitry disclosed herein can be implemented to manage abrupt changes in read phase error due to other phenomena or events. Accordingly, PLL circuitry of the present disclosure can be implemented in HAMR drives and conventional (i.e., non-HAMR) drives.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
   reading a data sector from a magnetic recording medium;
   detecting a change in a phase error at a location of the data sector;
   determining a phase offset using the phase error change; and
   re-reading the data sector location using the phase offset to recover the data sector location.

2. The method of claim 1, wherein:
   the change in the phase error signal is indicative of a mode hop that occurred while writing the data sector to the medium; and
   re-reading comprises re-reading the data sector location using the phase offset to recover the data sector location due to the mode hop.

3. The method of claim 1, wherein detecting the change in the phase error comprises comparing the phase error to a threshold.

4. The method of claim 1, wherein determining the phase offset comprises determining a magnitude and a direction of the change in the phase error.

5. The method of claim 1, further comprising:
determining the location of the data sector where the phase error changed; and
re-reading the data sector location after injecting the phase offset at a start of the data sector location.

6. The method of claim 1, wherein:
detecting the phase error change and determining the phase offset are performed by a phase-locked loop (PLL); and
the method further comprises increasing a bandwidth of the PLL in response to detecting the phase error change.

7. The method of claim 6, wherein increasing a bandwidth of the PLL comprises increasing a phase coefficient of the PLL.

8. The method of claim 1, wherein the method is performed in an error recovery mode.

9. An apparatus, comprising:
a phase detector of a read channel configured to receive an error signal for a data sector read from a magnetic recording medium, the phase detector configured to detect a change in a phase error in the error signal and to produce a phase error signal indicative of the phase error change;
a phase-locked loop (PLL) filter configured to receive the phase error signal and produce a phase signal;
a phase offset generator configured to receive the phase error signal and produce a phase offset signal using the phase error signal; and
an adder configured to sum the phase signal and the phase offset signal to produce a phase adjustment signal;
wherein the PLL filter has a bandwidth and is configured to increase the bandwidth in response to the phase error signal indicative of a mode hop that occurred while writing the data sector to the medium.

10. The apparatus of claim 9, wherein:
the read channel comprises an analog-to-digital converter (ADC) having an input for receiving a read signal for the data sector and an output coupled to the phase detector; and
a clock generator having an input coupled to the adder and an output coupled to the ADC, the clock generator configured to generate an adjusted clock signal in response to the phase adjustment signal.

11. The apparatus of claim 9, further comprising a threshold comparator coupled between the phase detector and the phase offset generator, the threshold comparator configured to compare the phase error signal to a threshold.

12. The apparatus of claim 9, wherein the phase offset generator is configured to determine a magnitude and a direction of the change in the phase error.

13. The apparatus of claim 9, wherein the phase offset generator is configured to determine a location of the data sector where the phase error changed.

14. An apparatus, comprising:
a recording head configured to write and read data sectors to and from a magnetic recording medium;
a read channel coupled to the recording head;
phase-locked loop (PLL) circuitry of the read channel configured to detect a change in a phase error at a location of the data sector, the PLL circuitry configured to determine a phase offset using the phase error; and
a controller configured to effect re-reading of the data sector location using the phase offset to recover the data sector location.

15. The apparatus of claim 14, wherein the PLL circuitry comprises a PLL filter having a bandwidth, the PLL filter configured to increase the bandwidth in response to the phase error signal indicative of a mode hop that occurred while writing the data sector to the medium.

16. The apparatus of claim 14, wherein the PLL circuitry is configured to inject the phase offset signal at a start of the data sector location during re-reading of the data sector.

17. The apparatus of claim 14, wherein the PLL circuitry is configured to detect the change in the phase error by comparing the phase error to a threshold.

18. The apparatus of claim 14, wherein the PLL circuitry is configured to determine a magnitude and a direction of the change in the phase error.

19. The apparatus of claim 14, wherein the PLL circuitry is configured to determine the location of the data sector where the phase error changed.

* * * * *